(12) United States Patent
Bevirt et al.

(10) Patent No.: US 10,315,760 B2
(45) Date of Patent: Jun. 11, 2019

(54) ARTICULATED ELECTRIC PROPULSION SYSTEM WITH FULLY STOWING BLADES AND LIGHTWEIGHT VERTICAL TAKE-OFF AND LANDING AIRCRAFT USING SAME

(71) Applicant: Joby Aviation, Inc., Santa Cruz, CA (US)

(72) Inventors: JoeBen Bevirt, Santa Cruz, CA (US); Alex Stoll, Santa Cruz, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 487 days.

(21) Appl. No.: 14/660,838

(22) Filed: Mar. 17, 2015

(65) Prior Publication Data

US 2016/0304194 A1 Oct. 20, 2016

Related U.S. Application Data

(63) Continuation-in-part of application No. 14/218,845, filed on Mar. 18, 2014, now Pat. No. 9,694,911.

(51) Int. Cl.

| | |
|---|---|
| *B64C 29/00* | (2006.01) |
| *B64C 7/02* | (2006.01) |
| *B64D 27/24* | (2006.01) |
| *B64C 27/08* | (2006.01) |
| *B64C 27/30* | (2006.01) |
| *B64C 27/28* | (2006.01) |
| *B64C 11/28* | (2006.01) |
| *B64C 39/06* | (2006.01) |

(52) U.S. Cl.
CPC ............ *B64C 29/0033* (2013.01); *B64C 7/02* (2013.01); *B64C 11/28* (2013.01); *B64C 27/08* (2013.01); *B64C 27/28* (2013.01); *B64C 27/30* (2013.01); *B64C 39/068* (2013.01); *B64D 27/24* (2013.01); *Y02T 50/62* (2013.01)

(58) Field of Classification Search
CPC ..... B64C 27/22; B64C 29/0008; B64C 27/30; B64C 29/0033; B64C 39/068; B64C 11/28; B64C 27/28; B64C 27/08; B64C 7/02; B64D 27/24; Y02T 50/62
See application file for complete search history.

(56) References Cited

U.S. PATENT DOCUMENTS

| | | | | |
|---|---|---|---|---|
| 3,081,964 A | * | 3/1963 | Quenzler | B64C 29/0033 244/51 |
| 3,089,666 A | * | 5/1963 | Quenzler | B64C 9/24 244/211 |
| 3,404,852 A | * | 10/1968 | Sambell | B64C 29/0033 244/17.13 |
| 3,528,630 A | * | 9/1970 | Ferris | B64C 27/50 244/12.3 |
| 3,592,412 A | * | 7/1971 | Glatfelter | B64C 29/0033 244/7 A |
| 3,693,910 A | * | 9/1972 | Aldi | B64C 27/30 244/7 A |

(Continued)

*Primary Examiner* — Valentina Xavier
(74) *Attorney, Agent, or Firm* — Michael A. Guth

(57) ABSTRACT

An aerial vehicle adapted for vertical takeoff and landing using pivoting thrust producing elements for takeoff and landing. An aerial vehicle which is adapted to takeoff with thrust units providing vertical thrust and then transitioning to a horizontal flight path. An aerial vehicle with pivoting thrust units with propellers, wherein some or all of the propellers are able to be stowed and fully nested during forward flight.

20 Claims, 10 Drawing Sheets

(56) References Cited

U.S. PATENT DOCUMENTS

| | | | | | |
|---|---|---|---|---|---|
| 3,795,372 | A | * | 3/1974 | Feldman | B64C 27/16 244/17.11 |
| 4,979,698 | A | * | 12/1990 | Lederman | B64C 29/0033 244/17.13 |
| 5,031,858 | A | * | 7/1991 | Schellhase | B64C 27/50 244/7 R |
| 5,085,315 | A | * | 2/1992 | Sambell | B64C 27/30 244/17.25 |
| 5,868,351 | A | * | 2/1999 | Stamps | B64C 27/50 244/12.4 |
| 7,147,182 | B1 | * | 12/2006 | Flanigan | B64C 29/0033 244/6 |
| 8,602,347 | B2 | * | 12/2013 | Isaac | B64C 29/0033 244/23 B |
| 8,733,690 | B2 | * | 5/2014 | Bevirt | B64C 29/0033 244/12.4 |
| 8,800,912 | B2 | * | 8/2014 | Oliver | B64C 29/0033 244/12.4 |
| 8,998,125 | B2 | * | 4/2015 | Hollimon | B64C 27/28 244/6 |
| 2010/0072325 | A1 | * | 3/2010 | Sambell | B64C 11/28 244/7 A |
| 2010/0264257 | A1 | * | 10/2010 | Brunken, Jr. | B64C 27/32 244/17.25 |
| 2011/0001020 | A1 | * | 1/2011 | Forgac | B64C 29/0033 244/7 A |
| 2014/0299708 | A1 | * | 10/2014 | Green | B64C 27/32 244/17.23 |
| 2015/0136897 | A1 | * | 5/2015 | Seibel | B64C 29/0033 244/6 |
| 2015/0232178 | A1 | * | 8/2015 | Reiter | B64C 29/0033 244/7 A |

* cited by examiner

ARTICULATED ELECTRIC PROPULSION SYSTEM WITH FULLY STOWING BLADES AND LIGHTWEIGHT VERTICAL TAKE-OFF AND LANDING AIRCRAFT USING SAME

CROSS-REFERENCE TO RELATED APPLICATIONS

This application is a continuation-in-part of U.S. patent application Ser. No. 14/218,845 to Bevirt et al., filed Mar. 18, 2014, which is hereby incorporated by reference in its entirety.

BACKGROUND

Field of the Invention

This invention relates to powered flight, and more specifically to a vertical take-off and flight control aircraft and flight method.

Description of Related Art

There are generally three types of vertical takeoff and landing (VTOL) configurations: wing type configurations having a fuselage with rotatable wings and engines or fixed wings with vectored thrust engines for vertical and horizontal translational flight; helicopter type configuration having a fuselage with a rotor mounted above which provides lift and thrust; and ducted type configurations having a fuselage with a ducted rotor system which provides translational flight as well as vertical takeoff and landing capabilities.

With VTOL aircraft, significantly more thrust may be required for takeoff and landing operations than during regular forward flight. This extra thrust may also be required during the transitions between vertical and horizontal flight. In the case of propeller driven aircraft, for example, with a plurality of pivoting thrust units using propellers for takeoff, some or many of these thrust units may be idled during regular, horizontal forward flight.

What is called for is a thrust unit utilizing a propeller which allows for rotation of the thrust unit from a position of vertical thrust to a position wherein the thrust unit provides horizontal thrust. What is also called for is a thrust unit which is capable of stowing the propeller blades completely, into a nested configuration.

SUMMARY

An aerial vehicle adapted for vertical takeoff and landing using pivoting thrust producing elements for takeoff and landing. An aerial vehicle which is adapted to takeoff with thrust units providing vertical thrust and then transitioning to a horizontal flight path. An aerial vehicle with pivoting thrust units with propellers, wherein some or all of the propellers are able to be stowed and fully nested during forward flight.

DETAILED DESCRIPTION

Figure 1:
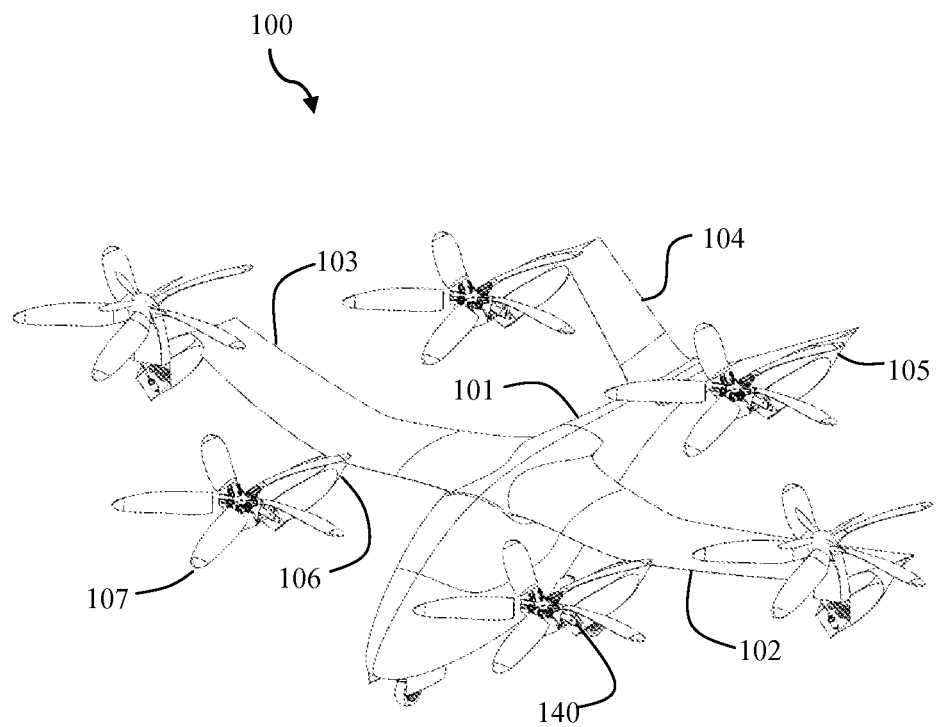
FIG. 1 is a perspective view of an aerial vehicle in a takeoff configuration according to some embodiments of the present invention.

Although vertical takeoff and landing (VTOL) aircraft have always been desired, compromises in the realization of these aircraft have limited their usefulness and adoption to certain niches. The thrust needed for VTOL is significantly higher than the thrust needed to maintain horizontal flight. The vertical take-off thrust may also be needed during the transition to forward flight. Once moving in forward flight, the wings of the aircraft provide lift, supplanting a function delivered by motors during VTOL and during transition. Thrust producing elements needed during take-off, but not during forward flight, may be altered during forward flight such that they impart less drag onto the flying system.

In some aspects, an aerial vehicle may use bladed propellers powered by electric motors to provide thrust during take-off. The propeller/motor units may be referred to as rotor assemblies. In some aspects, the motor driven propeller units on the wings may rotate relative to a fixed wing, such that the propellers provide vertical thrust for take-off and landing. The rotation of the motor driven propeller units may allow for directional change of thrust by rotating both the propeller and the electric motor, thus not requiring any gimbaling, or other method, of torque drive around or through a rotating joint. The motor driven propeller units may be referred to herein as motor driven rotor units.

In some aspects, some or all of the wing mounted motor driven rotors are adapted to have the rotor blades fold back into a stowed position wherein the blades nest in recesses in the adjoining nacelle body after a transition to horizontal flight. The nested blades may result in a significantly lower drag of the aerial vehicle, while also allowing a significantly reduced power usage with only some of the rotors providing forward thrust.

In some aspects, extended nacelles with two coaxial propellers are used such that one of the propellers is used during forward flight, and another during vertical take-off and landing. The VTOL propeller may be adapted to nest its blades during forward flight. In some aspects, the extended nacelle may reside at the tip of a wing, or at the end of a rear V-tail element. In some aspects, each of the coaxial propellers has its own electric motor. In some aspects, the coaxial propellers are driven by the same electric motor. In some aspects, the electric motor has directional clutches such that one propeller is driven while the motor rotates in a first direction, and the other propeller is driven while the motor rotates in a second direction.

In some aspects, the mass balance of the aerial vehicle may be altered by movement of masses such as the battery mass. In some aspects, the battery mass may be adjusted to retain balance when a different number of occupants are supported. In some aspects, mass balance may be adjusted in automatic response to sensors within the aerial vehicle. In some aspects, the battery mass may be distributed between a two or more battery packs. The battery packs may be mounted such that their position may be changed during flight in response to changes in the balance of the aerial vehicle. In some aspects, the flight control system of the aerial vehicle may sense differential thrust requirements during vertical take-off and landing, and may move the battery mass in order to achieve a more balanced thrust distribution across the rotor assemblies. In some aspects, the battery mass may be moved should there be a failure of a rotor assembly during transition or vertical take-off and landing, again to balance the thrust demands of the various remaining functioning rotors.

In some embodiments of the present invention, as seen in FIG. 1, an aerial vehicle 100 is seen in take off configuration. The aircraft body 101 supports a left wing 102 and a right wing 103. Motor driven rotor units 140 include propellers 107 which may stow and nest into the nacelle body 106. The aircraft body 101 extends rearward is also attached to raised rear stabilizers 104. The rear stabilizers have rear motors 105 attached thereto. Portions of the rotor unit have been omitted in FIG. 1 for illustrative clarity.

Figure 3:
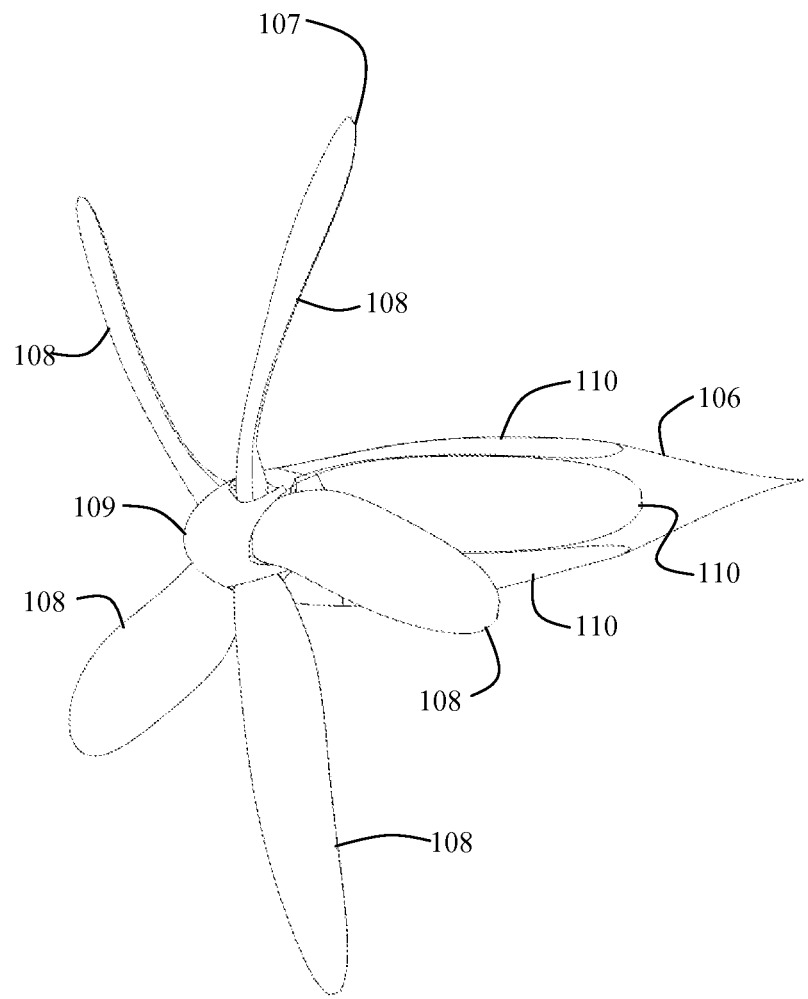
FIG. 3 is a view of a stowing blade system in a deployed forward flight configuration according to some embodiments of the present invention.

FIG. 1 illustrates the aerial vehicle 100 in a vertical take-off and landing configuration such that the thrust of the rotors is directed upward. The propellers 107 have been rotated relative to the nacelle bodies 106 using articulated linkages. In this vertical take-off and landing configuration, the aerial vehicle 100 is able to utilize six propellers providing thrust in a vertical direction. The propellers 107 are adapted to raise the vehicle 100. After the initial vertical take-off, the vehicle transitions to forward horizontal flight. The transition is facilitated by the articulation of the propellers from a vertical thrust configuration to positions off of vertical, transitioning to a horizontal thrust configuration. FIG. 3 is illustrative of the motor driven rotor unit in a powered forward flight configuration.

Figure 2:
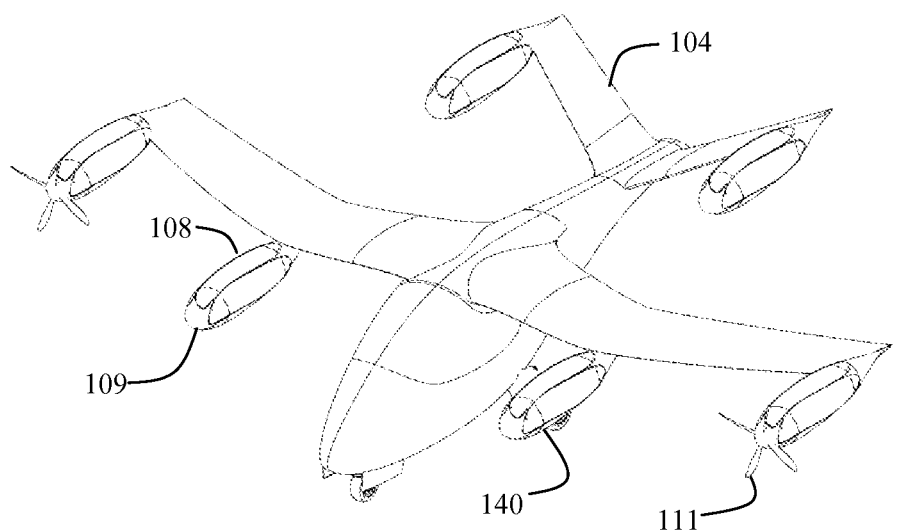
FIG. 2 is a perspective view of an aerial vehicle in a forward flight configuration according to some embodiments of the present invention.

As the aerial vehicle 100 transitions to a forward, horizontal, flight configuration, the wings 102, 103 begin to provide lift. Once traveling in a horizontal attitude, with speed, significantly less thrust is needed to propel the aerial vehicle 100 forward than was needed as vertical thrust during take-off. FIG. 2 illustrates a forward flight configuration of an aerial vehicle 100 wherein the blades 108 of the propellers 107 have been stowed into recesses 110 on the nacelle bodies 106. With the blades stowed during forward flight, a low drag profile may be attained. In some aspects, some of the main propellers 107 may be used for forward flight. In some aspects, all of the main propellers 107 may be stowed, and alternate forward flight propellers 111 may be used in forward flight.

In an exemplary configuration of the first embodiment, the aerial vehicle has 6 rotors and weighs 900 kg. The rotor diameters are 2.1 meters, with a thrust per rotor of 1500 N in hover. The continuous rpm of the motor at sea level is 1030 rpm, with a maximum of 1500 rpm. The wingspan is 7.5 meters. The battery mass is 360 kg, and the mass per motor is 9 kg. The cruise speed is 320 km/h. The continuous hover shaft power per motor is 25 kW at standard sea level conditions.

Figure 4:
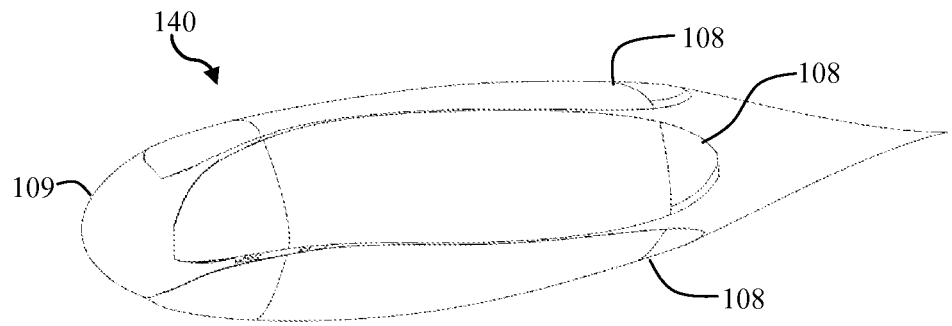
FIG. 4 is a perspective view of a stowing blade system in a stowed configuration according to some embodiments of the present invention.

FIGS. 3 and 4 illustrate the deployed and stowed configurations, respectively, of the main propellers 107 of the motor driven rotor units 140. In the deployed configuration, the propeller blades 108 of the propeller 107 are deployed to a position approximately perpendicular to the rotation axis of the motor driven rotor unit 140. The actual blade angle may vary as a function of motor rpm and other factors, as discussed below. A spinner 109 presents a leading surface for the motor driven rotor unit 140.

Figure 5:
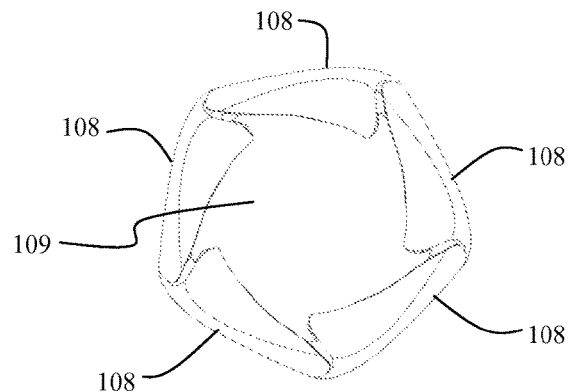
FIG. 5 is a front view of a stowing blade system in a stowed configuration according to some embodiments of the present invention.

In the stowed configuration, the blades 108 reside within recesses 110 in the nacelle body 106. As seen in front view in FIG. 5, in the stowed configuration the outer surface of the forward portion of the nacelle is composed of the surfaces of the blades 108 of the propeller 107. The outer surface of the nacelle with the blades in the stowed configuration is a composite of the five blades' surfaces. The blades and the nacelles may be designed in concert such that the nacelle aerodynamic requirements and those of the propeller fit into each other into a complementary design. The recesses 110 may be adapted to provide a very snug fit for the blades 108 in the stowed configuration.

Figure 6:
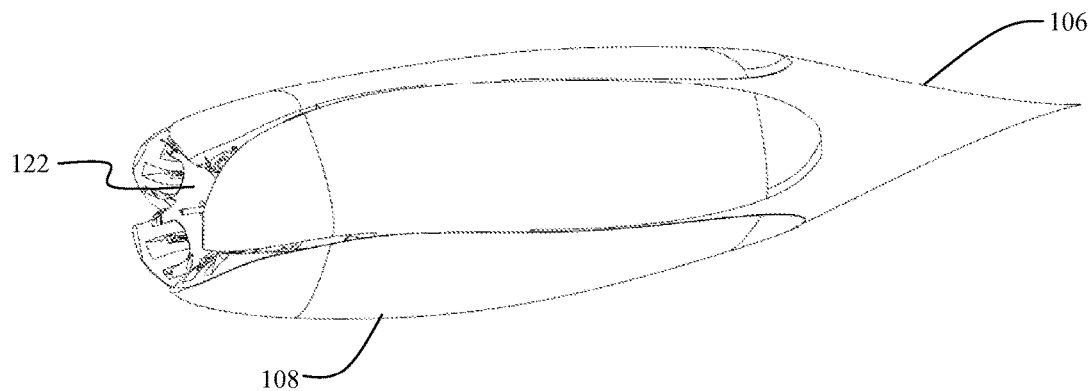
FIG. 6 is a partial view of a stowing blade system in a stowed configuration according to some embodiments of the present invention.
Figure 7:
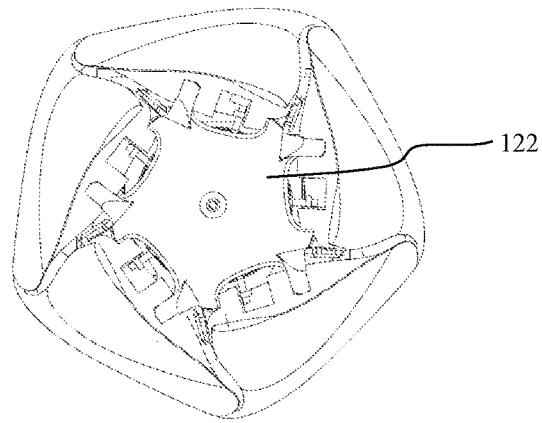
FIG. 7 is a front partial view of a stowing blade system in a stowed forward flight configuration according to some embodiments of the present invention.

FIGS. 6 and 7 illustrate a perspective view and a front view, respectively, of a motor driven rotor unit with the spinner removed to help the viewer visualize a design according to some aspects of the present invention. The main hub 122 is seen as a mounting point for each of the five propeller blades 108. The main hub 122 provides the main support of the propeller blades, which are each pivotally connected to the main hub. The main hub 122 also provides the drive torque to the blades 108 of the propeller 107. As discussed further below, the main hub 122 is coupled to the outboard bracket of the rotor deployment mechanism via a rotary bearing, or bearing assembly.

Figure 8:
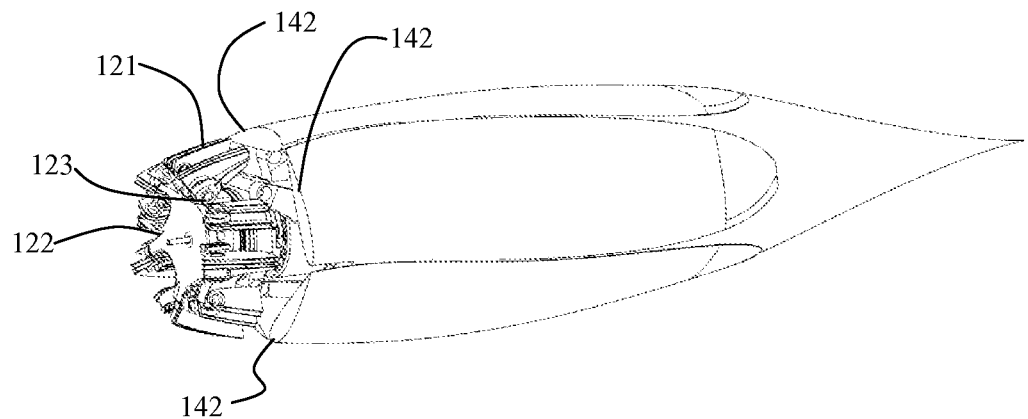
FIG. 8 is a partial view of a stowing blade system in a stowed configuration according to some embodiments of the present invention.
Figure 8A:
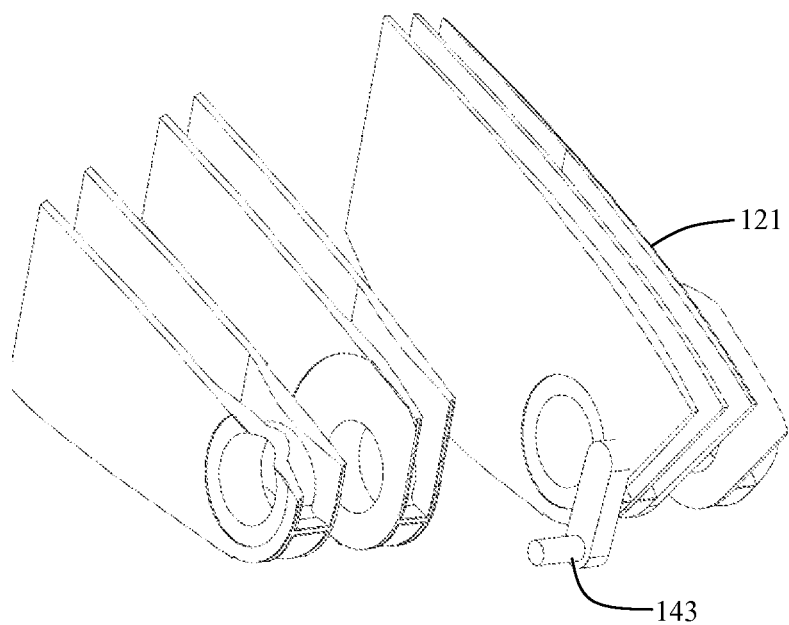
FIG. 8A is an illustration of a fin mount according to some embodiments of the present invention.

FIG. 8 illustrates a perspective view of a motor driven rotor unit with further portions removed for clarity of illustration. The propeller blade 108 is illustrated solely as a partial blade 142, allowing for observation of the fin mount 121. The fin mount 121 is bonded within the (missing in this view) inner portion of the propeller blade. In some aspects, the propeller blade is formed from a number of pre-formed pieces which are then bonded together, with the fin mount affixed therein. The fin mount 121 may be metal, and constructed such that it is adapted to allow for mounting to the main hub 122 with a hinge pin 123, for example. In some embodiments, as seen in FIG. 8A, the fin mount 121 may be a plurality of independent pieces. These pieces may be fixtured during assembly of the propeller blade 108 such that the finished component is adapted to mount to the main hub 122 with a hinge pin. A stowing tab 143 may be affixed to the fin mount 121 to allow for moving the blade into a stowed configuration into the recess and against the nacelle body. In some aspects, the propeller blade 108 may be of a composite material. The propeller blade 108 may be assembled from pieces such that the blade is a hollow shell assembled from pre-manufactured individual pieces. A deploy spring 141 allows for the blades of the propeller to achieve a deployed configuration in the absence of centrifugal forces. The deploy spring allows for full deployment of the propeller blades even when the rotors are not turning. To achieve full stowage, the stowing tabs 143 on the propeller blades 108 of the propeller 107 are pushed on by a stowing mechanism, until the blades are fit within the recesses 110 of the nacelle bodies.

Figure 9:
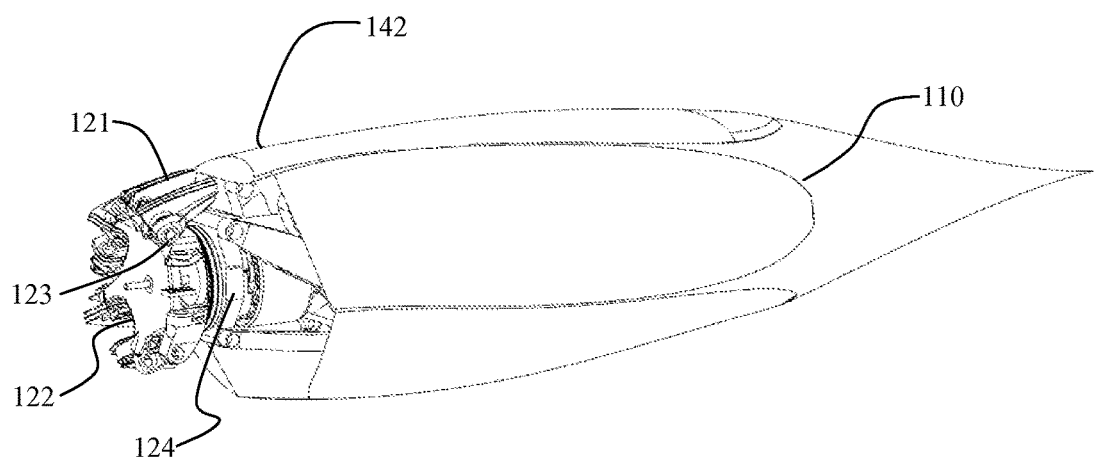
FIG. 9 is a partial view of a stowing blade system in a stowed configuration according to some embodiments of the present invention.

FIG. 9 illustrates another perspective view of a motor driven rotor unit with even further portions removed for clarity of illustration. The main hub 122 is seen supporting the fin mount 121. The fin mount 121 is adapted to pivot relative to the main hub 122 using a hinge pin 123. In some recesses, the partial blades 142 are seen, and other recesses 110 no blade is seen, for purpose of visual clarity only. As the further portions have been removed for illustrative effect, the rotor deployment mechanism, the motor, and other components come into view.

Figure 10:
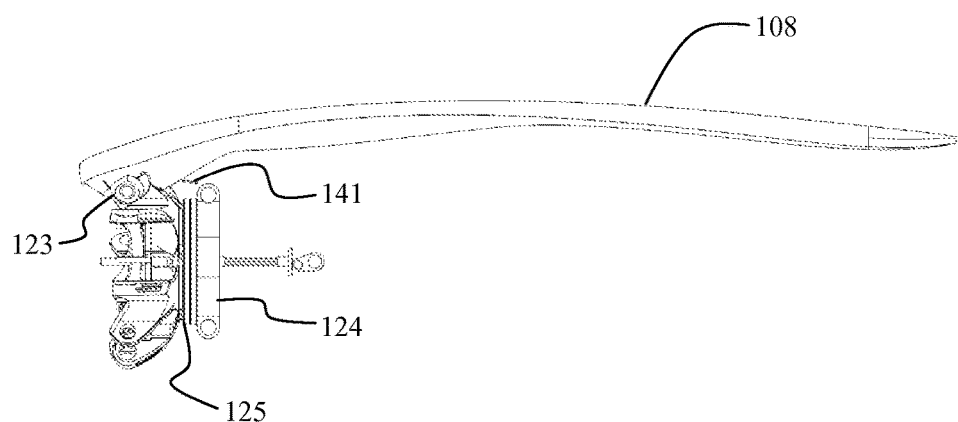
FIG. 10 is a side view of an exemplary blade stowed according to some embodiments of the present invention.

FIG. 10 illustrates a side view of portions of a rotor according to some embodiments of the present invention. The propeller blade 108 is seen in a stowed position. The propeller blade 108 is hinged with a hinge pin 123 to the main hub 122. The main hub is seen mounted within a bearing assembly 125. The bearing assembly 125 is mounted to the outboard bracket 124 of the rotor deployment mechanism. In some aspects, the main hub 122 is mounted to the inner race or races of the bearing assembly 125, and the outer race of the bearing assembly 125 is mounted within the outboard bracket 124 of the rotor deployment mechanism.

Figure 11:
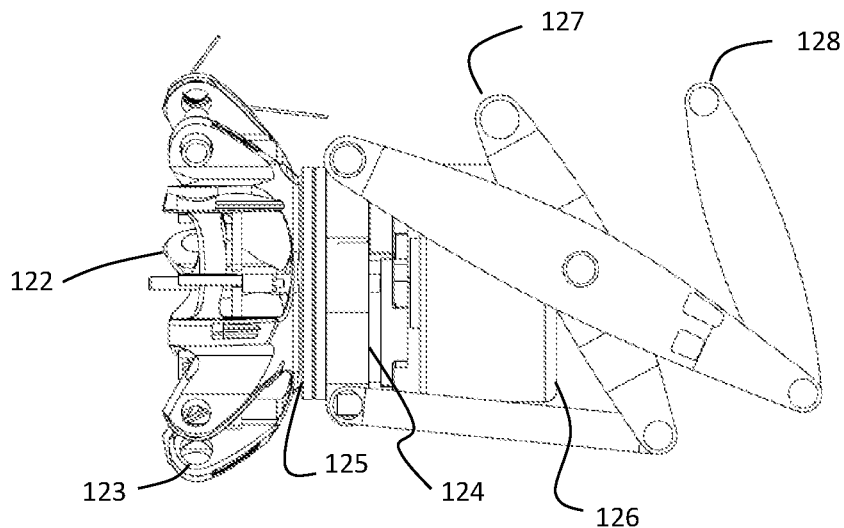
FIG. 11 is a side view of an articulated mounting system in a forward flight configuration according to some embodiments of the present invention.

FIG. 11 is a side view of portions of a rotor deployment mechanism of a deployable motor driven rotor assembly in a forward flight configuration according to some embodiments of the present invention. The main mounting points 127, 128 are the structural attachment points for the rotor deployment mechanism 143, and by extension, for the motor driven rotor unit, to the aerial vehicle. The drive motor 126 is adapted to drive the rotor main hub 122, and by extension, the propeller of the rotor unit. In this forward flight configuration, the rotor thrust vector is oriented facing with regard to the aerial vehicle, and is horizontal. In some aspects, with the use of rotor deployment mechanisms as described herein, the nacelle may be seen as being split during the rotor deployment such that the rear portion of the nacelle stays with the wing in a fixed positional relationship. The rotor deployment may then be able to occur from a nacelle along the wing, or along a rear horizontal stabilizer element. The rotor deployment mechanisms may be mounted at a position that is not the end of the wing, or other horizontal element.

Figure 12:
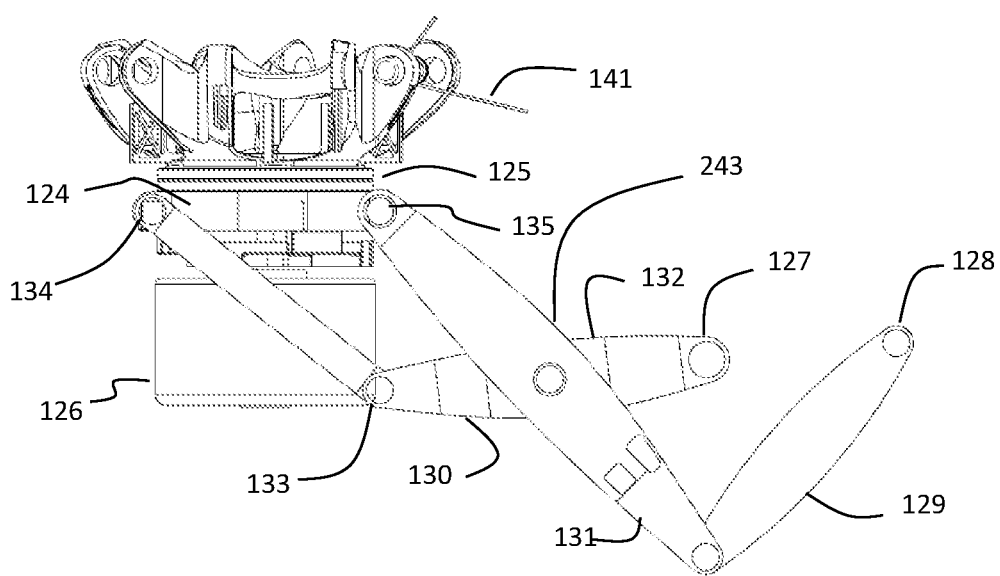
FIG. 12 is a side view of an articulated mounting system in a take off configuration according to some embodiments of the present invention.
Figure 13:
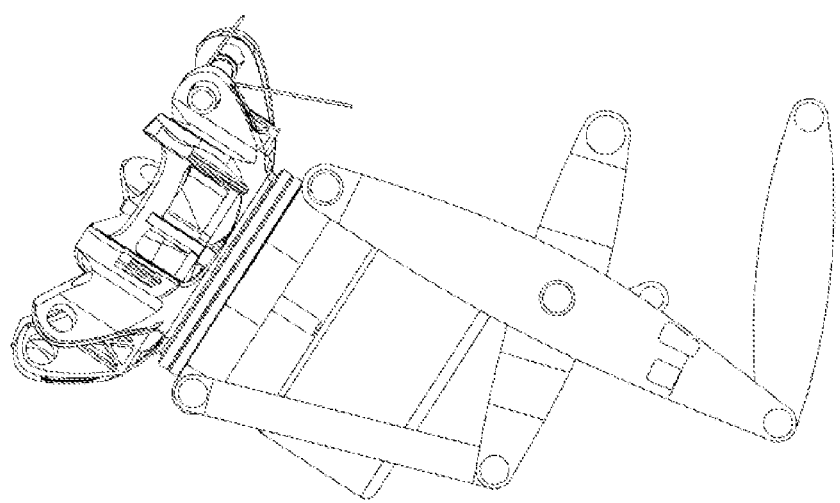
FIG. 13 is a side view of an articulated mounting system in a transitioning configuration according to some embodiments of the present invention.
Figure 14:
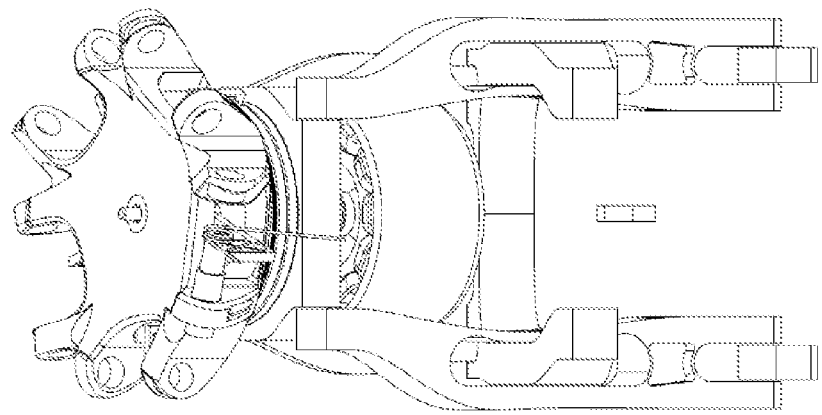
FIG. 14 is a top view of an articulated mounting system in a transitioning configuration according to some embodiments of the present invention.
Figure 15:
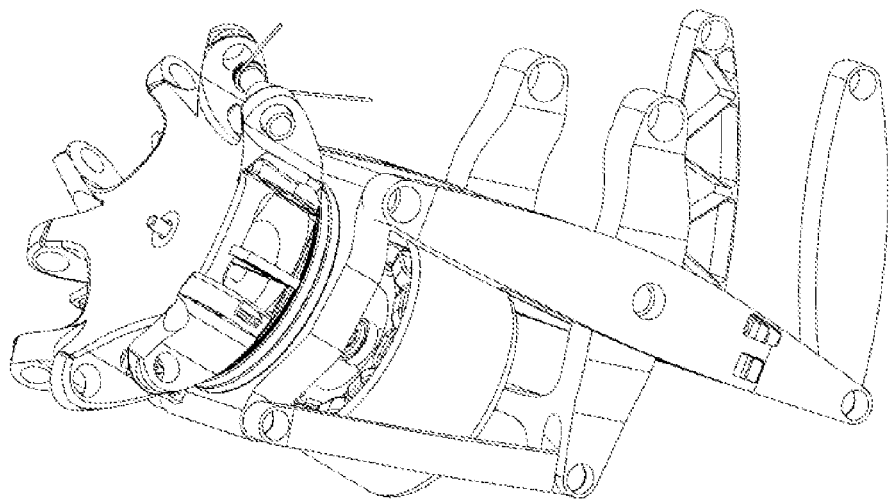
FIG. 15 is a perspective view of an articulated mounting system in a transitioning configuration according to some embodiments of the present invention.
Figure 16:
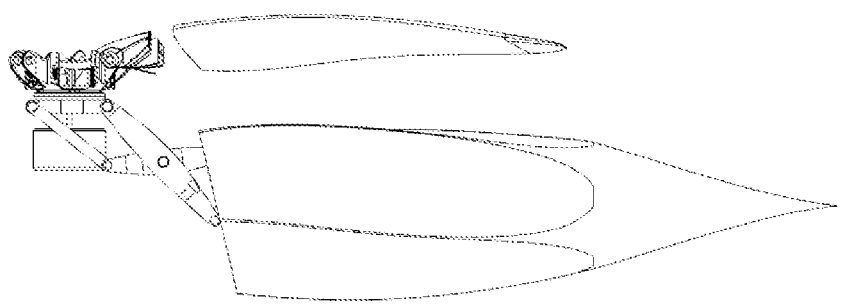
FIG. 16 is a partial side view of an articulating mounting system with its blades deployed according to some embodiments of the present invention.

FIG. 12 illustrates rotor deployment mechanism 243 in a deployed, vertical take-off, configuration. The rotor deployment mechanism has both rotated and displaced the rotor. The deployment has pushed the rotor hub forward, and away, from the main mounting points 127, 128, as well as upward vertically relative to the main mounting points. In this vertical take-off configuration, the rotor axis is vertical.

The outboard bracket 124 is attached to the deployment linkages at the bracket attach points 134, 135. The bracket arms 129, 130, 131 link via pivot points 132, 133. With the use of multi-arm linkages the rotor may be moved to preferred positions in both the deployed and stowed configurations. FIGS. 13-16 illustrate the rotor with its linkages in a partially deployed configuration, which is seen during transitions from vertical to horizontal thrusting, or from horizontal to vertical thrusting.

The electric motor/propeller combination being on the outboard side of the articulating joint allows for a rigid mounting of the propeller to the motor, which is maintained even as the propeller is moved through various attitudes relative to the rear nacelle portion. With such a configuration the rotating power from the motor need not be gimbaled or otherwise transferred across a rotating joint.

Figure 17:
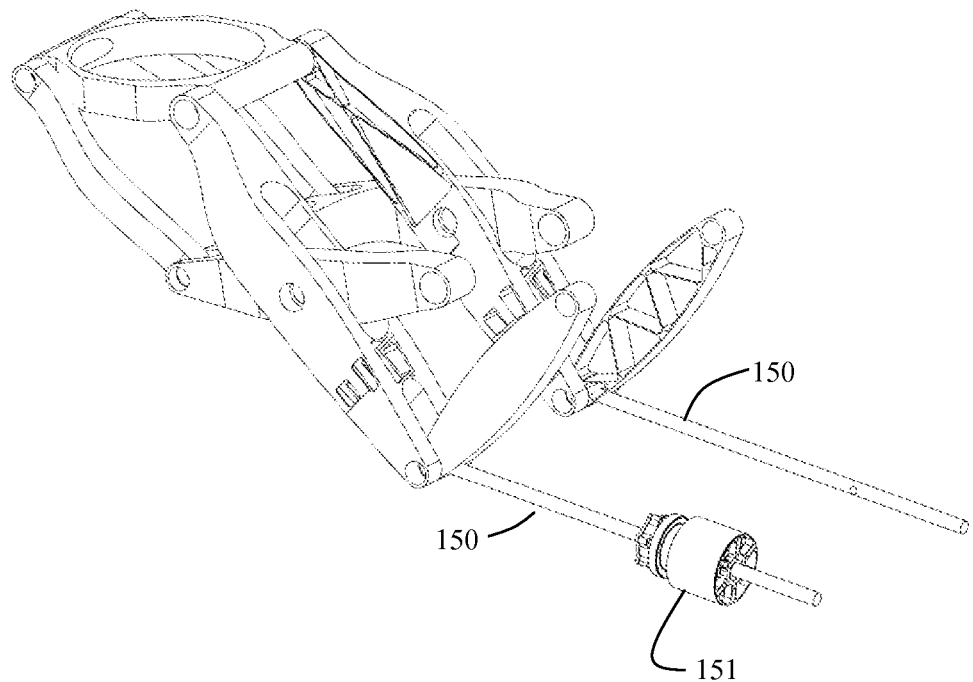
FIG. 17 is a rear perspective view of an articulated mounting system according to some embodiments of the present invention.

FIG. 17 illustrates a deployment drive system for a deployment mechanism according to some embodiments of the present invention. A drive unit 151 may be coupled to the aerial vehicle, within the wing in an area adjacent to the mounting points for the main mounting points 127, 128. Drive screws 150 may be driven such that the deployment linkage is driven from a stowed configuration to a deployed configuration, and from a deployed configuration to a stowed configuration.

Figure 18:
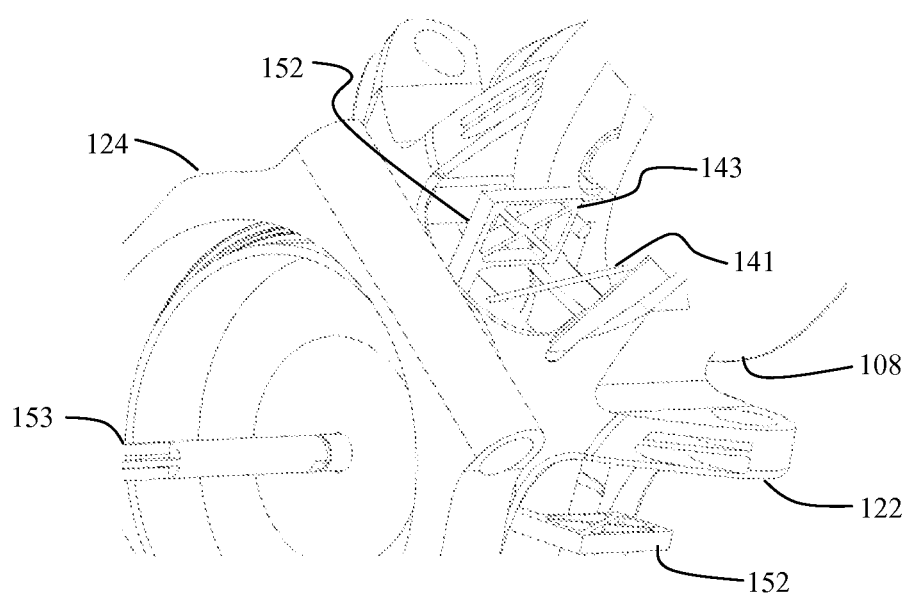
FIG. 18 is a partial view of the underside of a rotor hub according to some embodiments of the present invention.
Figure 19:
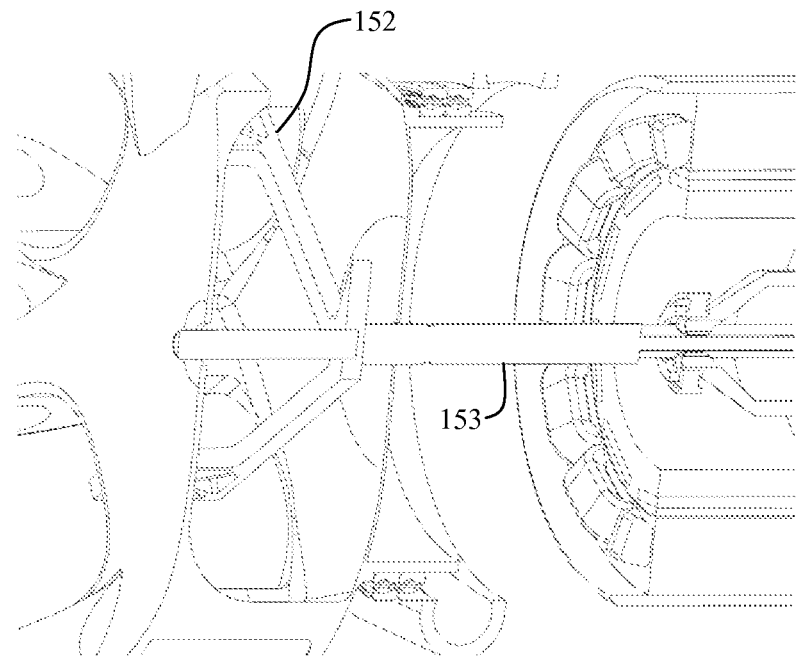
FIG. 19 is a partial side cutaway view of the stowing mechanics according to some embodiments of the present invention.
Figure 20:
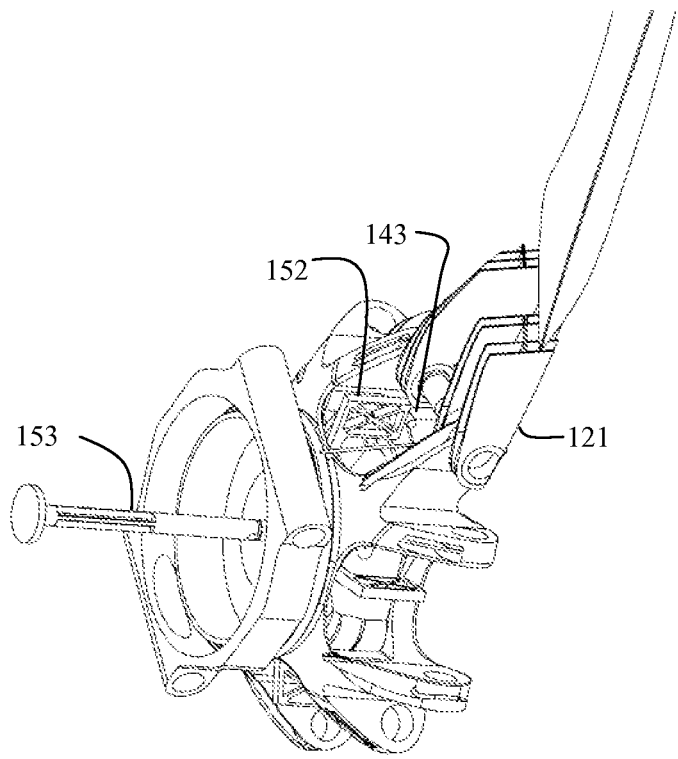
FIG. 20 is a bottom perspective view of the rotor stowing mechanics according to some embodiments of the present invention.

FIG. 18 is a partial view of the underside of a main rotor hub 122 mounted into an outboard bracket 124 of a rotor deployment mechanism according to some embodiments of the present invention. A stowing rod 153 is adapted to drive the stowing levers 152 against the stowing tabs 143. The stowing tabs 143 then drive the propeller blades into a nested position onto the nacelle body. The deploy springs 141 are adapted to deploy the propeller blades 108 from a stowed position to a deployed position. FIG. 19 is a partial side cutaway view of the stowing rod 153 coupled to a plurality of stowing levers 152. The stowing rod 153 may be driven by a linear actuator to engage the stowing tabs 143 in order to deploy the propeller blades from their stowed, nested, configuration. When fully deployed, the propeller blades will not reside on the stowing levers. FIG. 20 is a bottom perspective view of the stowing rod 153 and its coupling to the stowing levers 152, and ultimately to the fin mounts 121 of the propeller blades 108. Position indicators may be used to properly line up the propeller relative to the recesses in the nacelle.

In an exemplary embodiment of a method for flying an aerial vehicle with an articulated electric propulsion system and fully stowing blades, an aerial vehicle may be on the ground. The aerial vehicle may have a plurality of wing and tail mounted motor driven rotor units. The motor driven rotor units may begin with propeller blades that are stowed such that the stowed propeller blades comprise all or most of the effective wetted area of portions of the nacelles of which they form a part. The nacelles may have recesses adapted to receive the stowed blades.

The stowed blades may be held in the stowed position with the assistance of stowing mechanisms. In preparation for vertical take-off, the stowed blades may deploy to a deployed configuration. The blades may utilize deployment springs which assist with the deployment of the blades upon the release of stowing levers. The stowing levers may be adapted to pivot the propeller blades from a deployed to a stowed configuration.

Once the propeller blades are in a deployed position, the entire motor driven rotor assembly may be itself deployed from a forward flight position to a vertical take-off and landing position with the use of an articulating rotor deployment mechanism. The deployment mechanism is adapted to position the propellers in front of and above the wings, or otherwise clear of other aerial vehicle structure. With the propeller blades now deployed, and with the motor driven rotor units now articulated into a vertical take-off configuration, the aerial vehicle is able to begin a vertical take-off. The rotors are spun up and the vehicle rises from the ground.

After take-off, the aerial vehicle will begin a transition to forward flight by articulating the rotors from a vertical thrust orientation to a position which includes a horizontal thrust element. As the aerial vehicle begins to move forward with speed, lift will be generated by the wings, thus requiring less vertical thrust form the rotors. As the rotors are articulated further towards the forward flight, horizontal thrust, configuration, the aerial vehicle gains more speed.

Once the aerial vehicle is engaged in regular forward flight, the rotors in use during take-off may no longer be necessary. The thrust requirement for forward flight may be significantly less than that required during vertical take-off and landing. The forward flight may be maintained by just a subset of the rotor used for take-off, or by different rotors than those used during take-off. The unused rotors may have their propeller blades stowed in to recesses on the nacelles supporting the rotors. The stowed propeller blades may form the exterior surface of portions of the nacelle.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A stowable propeller system, said stowable propeller system comprising:
   a central hub, said central hub comprising a first rotation axis;
   a drive motor, said drive motor rigidly coupled to said central hub;
   a plurality of propeller blades, said plurality of propeller blades pivotally attached to said central hub; and
   a nacelle body, said nacelle body comprising recesses in its outer surface when said propeller blades are in a deployed position,
   wherein said propeller blades are adapted to stow into said recesses in the outer surface of the nacelle body, said blades when stowed comprising all or most of the effective wetted area of portions of the nacelle.

2. The stowable propeller system of claim 1 wherein said stowable propeller system further comprises a first principal axis along its center, and wherein said propeller blades are adapted to pivot from a stowed position in the recesses of the nacelle body to a deployed position to a deployed position substantially perpendicular to said first rotation axis.

3. The stowable propeller system of claim 2 further comprising a rotary positional sensor adapted to sense the rotary position of said propeller blades relative to said nacelle body.

4. The stowable propeller system of claim 2 further comprising a stowing mechanism, said stowing mechanism adapted to stow said propeller blades into said recesses in the outer surface of the nacelle body.

5. The stowable propeller system of claim 3 further comprising a stowing mechanism, said stowing mechanism adapted to stow said propeller blades into said recesses in the outer surface of the nacelle body.

6. The stowable propeller system of claim 4 further comprising a spring system adapted to deploy the propeller blades from their stowed position.

7. The stowable propeller system of claim 5 further comprising a spring system adapted to deploy the propeller blades from their stowed position.

8. The stowable propeller system of claim 1 further comprising a rotor deployment mechanism, said rotor deployment mechanism coupled to said central hub on a first end, said rotor deployment mechanism coupled to mounting points within said nacelle body on a second end, wherein said rotor deployment mechanism is adapted to deploy said central hub and said drive motor.

9. The stowable propeller system of claim 8 wherein said nacelle body comprises a first principal axis along its center, and wherein said rotor deployment mechanism comprises one or more linkage assemblies adapted to deploy said central hub and said drive motor from a first position wherein said first rotation axis and said first principal axis are parallel to a second position wherein said first rotation axis and said first principal axis are substantially perpendicular.

10. The stowable propeller system of claim 6 further comprising a rotor deployment mechanism, said rotor deployment mechanism coupled to said central hub on a first end, said rotor deployment mechanism coupled to mounting points within said nacelle body on a second end, wherein said rotor deployment mechanism is adapted to deploy said central hub and said drive motor.

11. The stowable propeller system of claim 10 wherein said nacelle body comprises a first principal axis along its center, and wherein said rotor deployment mechanism comprises one or more linkage assemblies adapted to deploy said central hub and said drive motor from a first position wherein said first rotation axis and said first principal axis are parallel to a second position wherein said first rotation axis and said first principal axis are substantially perpendicular.

12. The stowable propeller system of claim 8 wherein said nacelle body comprises a first principal axis along its center, and wherein said rotor deployment mechanism comprises one or more linkage assemblies adapted to deploy said central hub from a first position wherein said first rotation axis and said first principal axis are parallel to a second position wherein said first rotation axis and said first principal axis are perpendicular, and further wherein the deployment of the central hub deploys said central hub away from said main rotor mounting nacelle body, wherein the deployment of the central hub deploys said central hub away from said first principal axis.

13. The stowable propeller system of claim 10 wherein said nacelle body comprises a first principal axis along its center, and wherein said propeller deployment mechanism comprises one or more linkage assemblies adapted to deploy said central hub from a first position wherein said first rotation axis and said first principal axis are parallel to a second position wherein said first rotation axis and said first principal axis are perpendicular, and further wherein the deployment of the central hub deploys said central hub away from said nacelle body, wherein the deployment of the central hub deploys said central hub away from said first principal axis.

14. A stowable propeller system, said stowable propeller system comprising:
  a first propeller portion, said first propeller portion comprising:
    a central hub, said central hub comprising a first rotation axis;
    a drive motor, said drive motor rigidly coupled to said central hub;
    a first plurality of propeller blades, said first plurality of propeller blades pivotally attached to said central hub;
    a main rotor mounting nacelle, said main rotor mounting nacelle comprising:
      a first principal axis along the center of said main rotor mounting nacelle;
      a hub support coupled to said central hub;
      a nacelle body, said nacelle body comprising recesses in its outer surface when said first plurality of propeller blades are in a deployed position, wherein said first plurality of propeller blades are adapted to stow into said recesses in the outer surface of the nacelle body, said first plurality of propeller blades when stowed comprising all or most of the effective wetted area of portions of the nacelle, and
  a second propeller portion, said second propeller portion comprising:
    a second plurality of propeller blades, said second plurality of propeller blades coupled to said central hub.

15. The stowable propeller system of claim 14 wherein said first plurality of propeller blades are adapted to pivot from a stowed position in the recesses of the nacelle body to a deployed position to a deployed position substantially perpendicular to said first rotation axis.

16. The stowable propeller system of claim 15 further comprising a stowing mechanism, said stowing mechanism adapted to stow said first plurality of propeller blades into said recesses in the outer surface of the nacelle body.

17. The stowable propeller system of claim 1 wherein the blades of said plurality of propeller blades are forward swept blades.

18. The stowable propeller system of claim 8 wherein the blades of said plurality of propeller blades are forward swept blades.

19. The stowable propeller system of claim 12 wherein the blades of said plurality of propeller blades are forward swept blades.

20. The stowable propeller system of claim 14 wherein the blades of said first plurality of propeller blades are forward swept blades.

* * * * *